United States Patent
Luo et al.

(10) Patent No.: US 9,418,254 B2
(45) Date of Patent: Aug. 16, 2016

(54) INTEGRATED CIRCUIT FILM AND METHOD FOR MANIPULATING THE SAME

(71) Applicant: Mxtran Inc., Hsin Chu (TW)

(72) Inventors: Huan-Chin Luo, Hsinchu County (TW); Wan-Sheng Ni, Taipei (TW); Chih-Hong Tsai, New Taipei (TW); Chin-Sheng Lin, Zhubei (TW)

(73) Assignee: MXTRAN INC., Hsin Chu (TW)

( * ) Notice: Subject to any disclaimer, the term of this patent is extended or adjusted under 35 U.S.C. 154(b) by 128 days.

(21) Appl. No.: 13/961,924

(22) Filed: Aug. 8, 2013

(65) Prior Publication Data

US 2014/0218171 A1    Aug. 7, 2014

Related U.S. Application Data

(60) Provisional application No. 61/759,473, filed on Feb. 1, 2013.

(51) Int. Cl.
*H04Q 5/22* (2006.01)
*G06K 7/06* (2006.01)
(Continued)

(52) U.S. Cl.
CPC ............ *G06K 7/065* (2013.01); *G06K 7/10237* (2013.01); *G06K 7/10247* (2013.01); *G06K 7/10297* (2013.01); *G06K 7/10336* (2013.01); *G06K 19/0727* (2013.01); *H04B 1/3816* (2013.01); *H04B 1/401* (2013.01)

(58) Field of Classification Search
CPC .................................................... G06K 7/0008
USPC ................ 375/219; 455/558, 41.1; 29/832
See application file for complete search history.

(56) References Cited

U.S. PATENT DOCUMENTS 6,326,683 B1 * 12/2001 Houdeau .......... G06K 19/07743
257/668
6,675,470 B2 * 1/2004 Muramatsu ..................... 29/832
(Continued)

FOREIGN PATENT DOCUMENTS

CN        101714221 A      5/2010
CN        202110572 U      1/2012
(Continued)

OTHER PUBLICATIONS

TW Office Action dated Mar. 31, 2015 in corresponding Taiwan application (No. 102128787).
(Continued)

*Primary Examiner* — Benjamin C Lee
*Assistant Examiner* — Israel Daramola
(74) *Attorney, Agent, or Firm* — McClure, Qualey & Rodack, LLP

(57) ABSTRACT

An integrated circuit film comprising a circuit board and a control circuit is provided. The circuit board has an IC-installation part and a contact part and having a first surface and a second surface opposite to the first surface. The contact part comprises a first set of pads and a second set of pads. The first set of pads are located on the first surface for communicating with an electrical communication device. The second set of pads are located on the second surface for communicating with a smart card. The control circuit is mounted on the IC-installation part for communicating with the electrical communication device through one of the first set of pads configured in accordance with a single wire protocol (SWP), a communication protocol.

20 Claims, 7 Drawing Sheets

(51) Int. Cl.
  *G06K 7/10* (2006.01)
  *G06K 19/07* (2006.01)
  *H04B 1/3816* (2015.01)
  *H04B 1/401* (2015.01)

(56) References Cited

U.S. PATENT DOCUMENTS

| | | | |
|---|---|---|---|
| 8,577,290 B2 * | 11/2013 | White | 455/41.1 |
| 2004/0087339 A1 * | 5/2004 | Goldthwaite et al. | 455/558 |
| 2008/0320187 A1 | 12/2008 | Kim | |
| 2009/0134212 A1 | 5/2009 | Chamley | |
| 2010/0090805 A1 | 4/2010 | Libotte | |
| 2010/0267419 A1 * | 10/2010 | Nishizawa et al. | 455/558 |
| 2012/0292395 A1 * | 11/2012 | Huang | G06K 19/07733 235/492 |
| 2013/0064271 A1 * | 3/2013 | van de Beek et al. | 375/219 |
| 2013/0127600 A1 * | 5/2013 | Li | G06K 7/10237 340/10.5 |

FOREIGN PATENT DOCUMENTS

| | | |
|---|---|---|
| CN | 102063635 B | 1/2013 |
| EP | 2280489 A1 | 2/2011 |
| EP | 2472730 A1 | 7/2012 |
| TW | M427626 U1 | 4/2012 |

OTHER PUBLICATIONS

CN Office Action dated Jul. 24, 2015 in corresponding Chinese application (No. 201310356236.4).
EP Search Report dated Nov. 4, 2015 in corresponding application (No. 13184786.5-1806 / 2763080).

* cited by examiner

INTEGRATED CIRCUIT FILM AND METHOD FOR MANIPULATING THE SAME

This application claims the benefit of U.S. provisional application Ser. No. 61/759,473, filed Feb. 1, 2013, the subject matter of which is incorporated herein by reference.

BACKGROUND OF THE INVENTION

1. Field of the Invention

The invention relates in general to an integrated circuit film and method for manipulating the same, and more particularly to an integrated circuit film for communicating with an electrical communication device, and for communicating with a smart card.

2. Description of the Related Art

Mobile communication devices are widely used by people in daily life. Utilizing the mobile communication devices as tools for performing business payment or other near field communication (NFC) functions is a trend in the future. There are two main ways to achieve the functions by the mobile phone. One is by downloading related software from the internet software bank of mobile phones, and the other is by applying a smart card, for example, a SIM (subscriber identity module) card, having a corresponding function. Both of these two ways are inconvenient to the users.

SUMMARY OF THE INVENTION

The invention relates in general to an integrated circuit film and method for manipulating the same, and more particularly to an integrated circuit film comprising a circuit board having a first set of pads for communicating with an electrical communication device and a second set of pads for communicating with a SIM card.

According to a first aspect of the present invention, an integrated circuit film comprising a circuit board and a control circuit is provided. The circuit board has an IC-installation part and a contact part and having a first surface and a second surface opposite to the first surface. The contact part comprises a first set of pads and a second set of pads. The first set of pads are located on the first surface for communicating with an electrical communication device. The second set of pads are located on the second surface for communicating with a smart card. The control circuit is mounted on the IC-installation part for communicating with the electrical communication device through one of the first set of pads in accordance with a single wire protocol (SWP), a communication protocol.

According to a second aspect of the present invention, a manipulating method for an integrated circuit film is disclosed. The manipulating method comprises following steps. A circuit board and a control circuit are provided. The circuit board has an IC-installation part and a contact part. The control circuit mounts on the IC-installation part. There is a first surface and a second surface opposite to the first surface on the circuit board. The contact part has a first set of pads and a second set of pads. The first set of pads, which locate on the first surface, communicate with an electrical communication device. The second set of pads, which locate on the second surface, communicate with a smart card, for example, SIM card. The control circuit communicates with the electrical communication device through one of the first set of pads in accordance with the SWP.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1A:
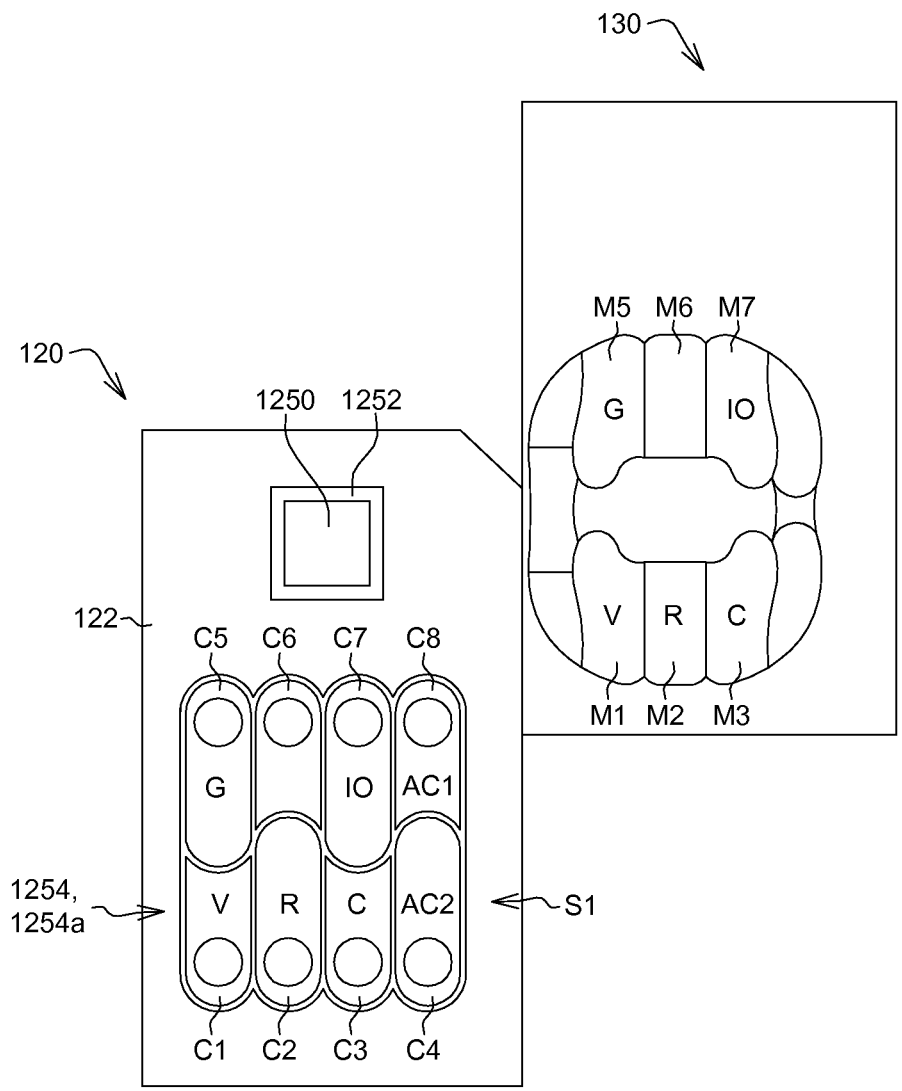
FIG. 1A illustrates a diagram showing an integrated circuit film and a smart card according to one embodiment of the invention.

FIG. 1A illustrates a diagram showing an integrated circuit film 120 and a smart card 130, such as a subscriber-identity-module (SIM) card. The integrated circuit film 120 can be used to be attached on the smart card 130 and be put into an electrical communication device (not shown) along with the smart card 130. Referring to FIG. 1A, the integrated circuit film 120 comprises a circuit board 122, having an IC-installation part 1252 and a contact part 1254. The circuit board 122 has a first surface 51 and a second surface (not shown). The second surface is opposite to the first surface 51.

The contact part 1254 comprises a first set of pads 1254a located on the first surface S1 for communicating with an electrical communication device (not illustrated). The electrical communication device can be a mobile phone, a smart phone, a tablet computer or a computer having a NFC controller, etc. A second set of pads (not illustrated) are located on the second surface (opposite to the first surface S1) for communicating with the smart card 130.

In one embodiment, the arrangement of each of the first set of pad 1254a and second set of pad (not illustrated) are configured in accordance with an ISO 7816 standard and its derivatives, ISO 7816 protocol. Each corresponding pad of the first set of pads and the second set of pads locates on the first surface S1 and the second surface (not illustrated) at a same location. According to the ISO 7816 protocol, each of the first set of pads and the second set of pads comprises pad C1, pad C2, pad C3, pad C5, pad C6 and pad C7. According to the RFID (Radio Frequency Identification) protocol, each of the first set of pads and the second set of pads further comprises pad C4 and pad C8. The pads C1, C2, C3, C5, C6 and C7 of the first set of pads at the contact part 1254 correspond to electrical connecting pins M1, M2, M3, M5, M6 and M7 of the smart card 130 respectively.

The electrical connecting pin M1 is, for example, a power connection pin for supplying an operation power to a microprocessor chip of the smart card 130. The electrical connecting pin M2 is a reset pin for sending signal to the microprocessor chip of the smart card 130 to initiate and/or reset a sequence of instructions. The electrical connecting pin M3 is a clock signal pin for providing a clock signal to the microprocessor chip for controlling a variety of operating timings.

As shown in FIG. 1A, a control circuit 1250 mounts on the IC-installation part 1252 for communicating with the electrical communication device through pad C6 of the first set of pads 1254*a* in accordance with a single wire protocol (SWP), a communication protocol. In one embodiment, the control circuit 1250 communicates with the electrical communication device and the smart card 130 through the first set of pads 1254*a* and the second set of pads respectively in accordance with the ISO 7816 protocol. In another embodiment, some of the corresponding pads of the first and the second set of pads are respectively connected directly, but excluding the pad C6, for SWP communication, and C7 of the first set of pads. C6 and C7 are connected to the control circuit 1250.

Figure 1B:
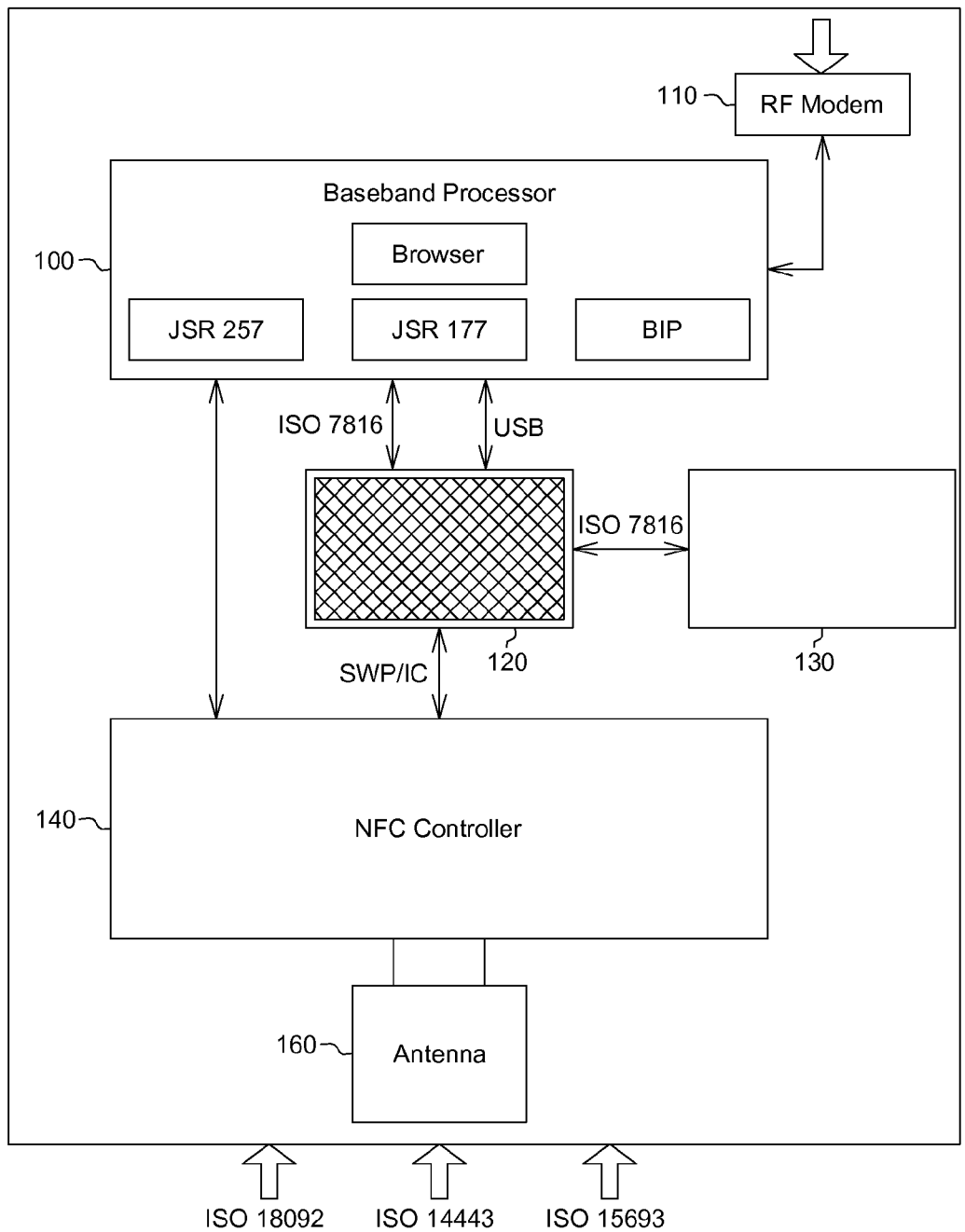
FIG. 1B illustrates a diagram showing a system platform according to one embodiment of the invention.

FIG. 1B illustrates a diagram showing a system platform 10. The system platform 10 comprises an integrated circuit film 120, a smart card 130, a baseband processor 100 and a NFC controller 140 of the electrical communication device (not illustrated), an RF modem 110, and an antenna 160. The smart card 130 is, for example, a SIM card. The electrical communication device is, for example, a mobile phone. The RF modem 110 communicates with the baseband processor 100. The baseband processor 100 supports processing functions such as a browser function. The baseband processor 100 complies with JAVA Specification Requests, for example, JSR 257 and JSR 177 and a basic image profile (BIP).

Second Embodiment

Figure 2A:
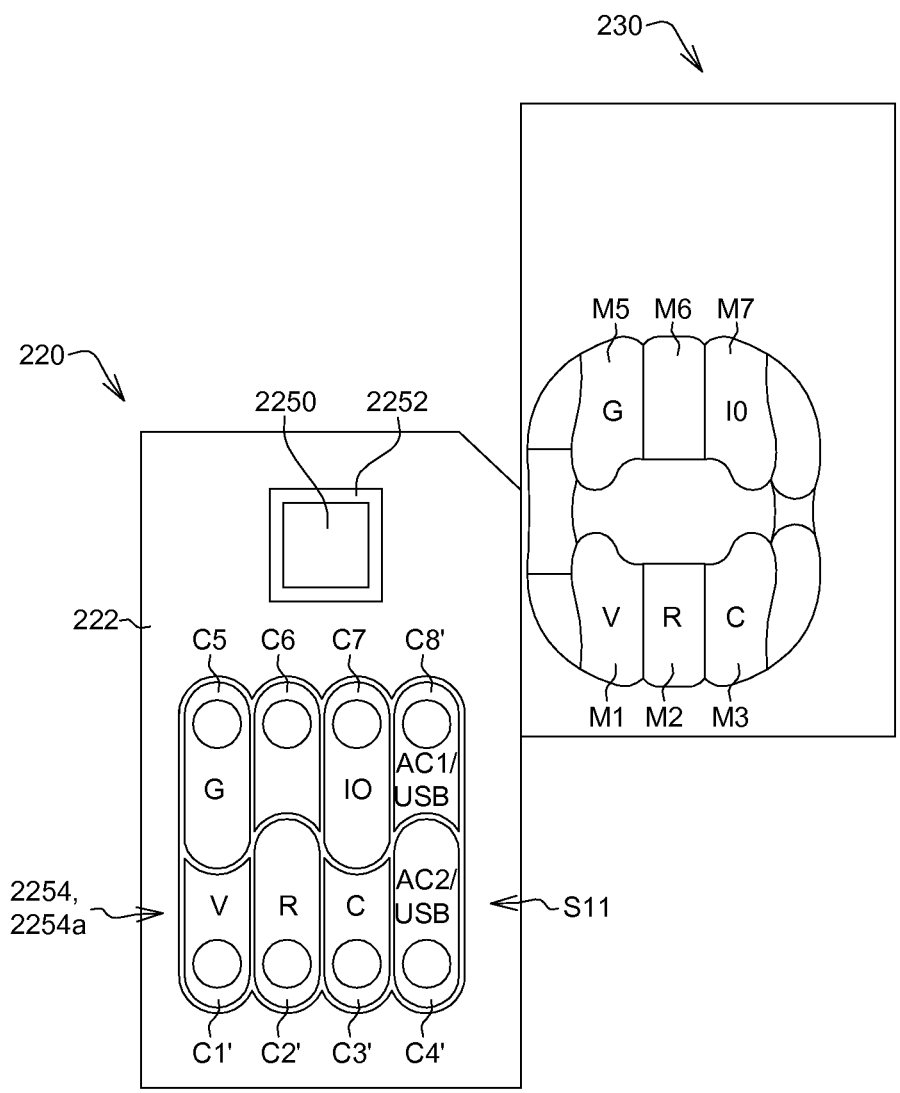
FIG. 2A illustrates a diagram showing an integrated circuit film and a smart card according to another one embodiment of the invention.

FIG. 2A illustrates a diagram showing an integrated circuit film 220 and a smart card 230, such as a SIM card. The integrated circuit film 220 attaches on the smart card 230. Referring to FIG. 2A, the integrated circuit film 220 comprises a circuit board 222, having an IC-installation part 2252 and a contact part 2254. The circuit board 222 has a first surface S11 and a second surface (not shown). The second surface is opposite to the first surface S11.

The contact part 2254 comprises a first set of pads 2254*a* located on the first surface S11 for communicating with an electrical communication device (not illustrated) having a NFC controller. A second set of pads (not illustrated) are located on the second surface (opposite to the first surface S11) for communicating with the smart card 230.

As shown in FIG. 2A, a control circuit 2250 mounts on the IC-installation part 2252 for communicating with the electrical communication device through one of the first set of pads 2254*a* configured in accordance with a single wire protocol (SWP).

In one embodiment, the arrangement of each of the first set of pad 2254*a* and second set of pad (not illustrated) are configured in accordance with the ISO 7816 protocol. Each corresponding pad of the first set of pads and the second set of pads locates on the first surface S11 and the second surface (not illustrated) at a same location. According to the ISO 7816 protocol, each of the first set of pads and the second set of pads comprises pad C1, pad C2, pad C3, pad C5, pad C6 and pad C7. According to the RFID protocol, each of the first set of pads and the second set of pads further comprises pad C4' and pad C8'. The pads C1, C2, C3, C5, C6 and C7 of the first set of pads at the contact part 2254 correspond to electrical connecting pins M1, M2, M3, M5, M6 and M7 of the smart card 230 respectively.

In one embodiment, the control circuit 2250 communicates with the electrical communication device and the smart card 230 through the first set of pads 2254*a* and the second set of pads respectively in accordance with the ISO 7816 protocol.

In one embodiment, the corresponding pads of the first and the second set of pads are respectively connected directly except the pads C6 and C7 of the first set of pads.

Figure 2B:
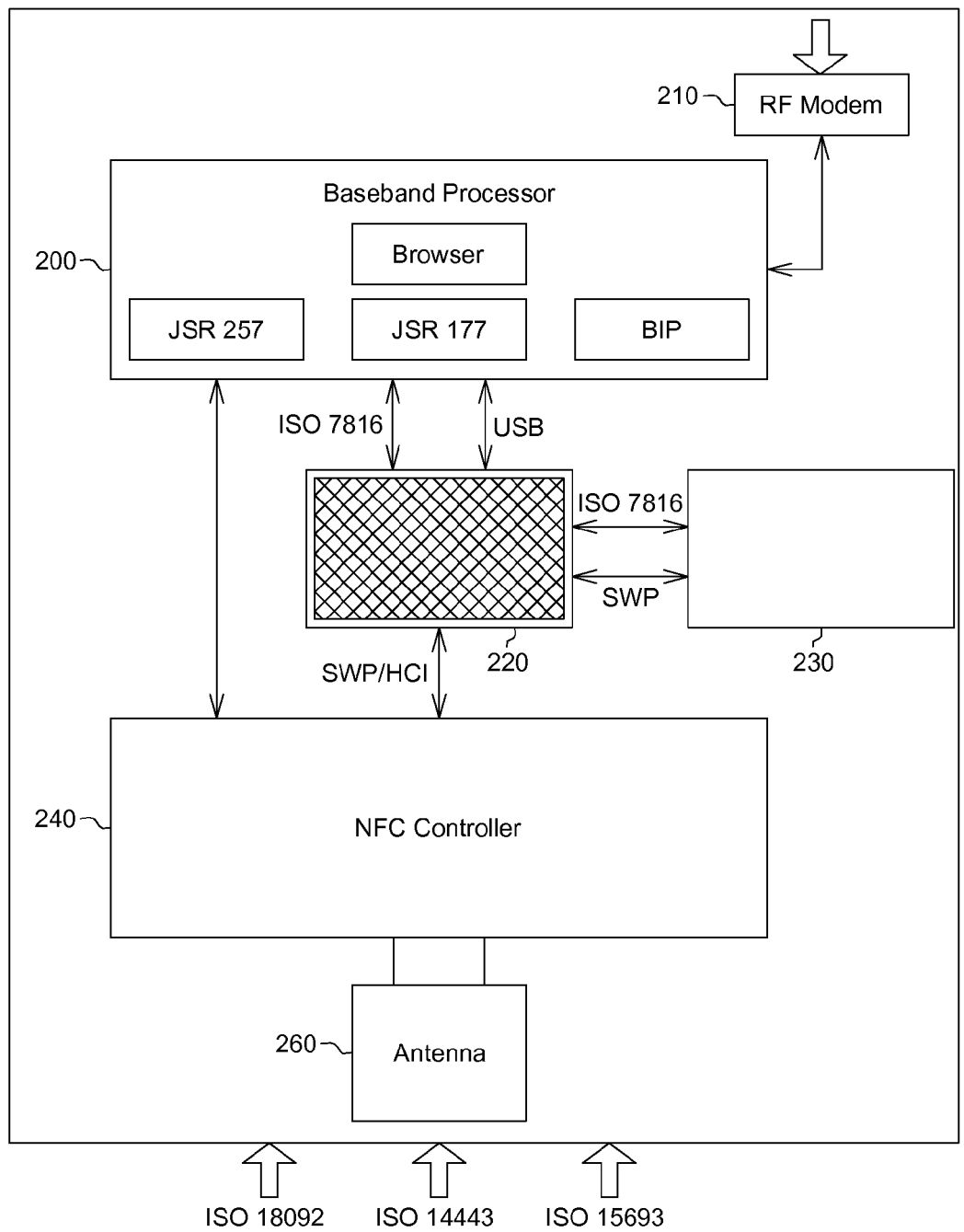
FIG. 2B illustrates a diagram showing a system platform according to another one embodiment of the invention.

FIG. 2B illustrates a diagram showing a system platform 20.

The system platform 20 comprises an integrated circuit film 220 and a smart card 230, a baseband processor 200 and a NFC controller 240 of the electrical communication device (not illustrated), an RF modem 210, and an antenna 260. The smart card 230 is, for example, a SIM card. The electrical communication device is, for example, a mobile phone. The RF modem 210 communicates with the baseband processor 200. The system platform 20 of FIG. 2B is similar to the system platform 10 of FIG. 1B. The difference between the system platform 20 and the system platform 10 is that the control circuit 2250 of FIG. 2A also communicates with the smart card 230 through one of the second set of pads configured in accordance with the SWP. The control circuit 2250 comprises a selection unit (not shown). The selection unit chooses to communicate with the communication device only, or communicate with both of the communication device and the smart card 230.

Third Embodiment

Figure 3A:
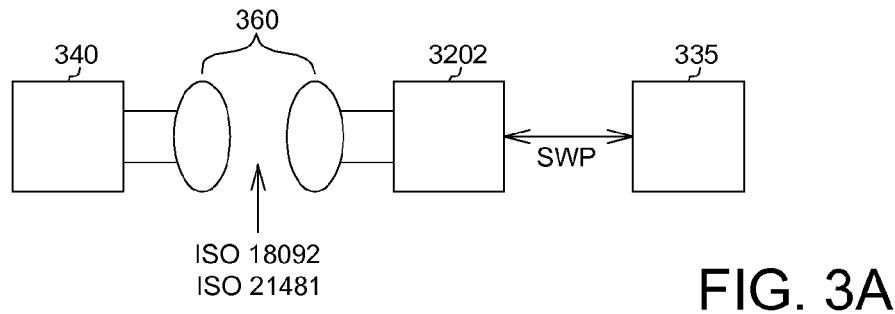
FIG. 3A illustrates a diagram showing the operation between the NFC device (or NFC tag), the NFC controller and the smart card or a security element (SE) according to still another one embodiment of the invention.

FIG. 3A illustrates a diagram showing the operation between the NFC device 340 (or NFC tag), the NFC controller 3202, and the smart card or a security element (SE) 335. In one embodiment, the control circuit on an integrated circuit film comprises a control unit functioning as a near field communication (NFC) controller 3202. The first set of pads comprises two pads C4 and C8 (shown in FIG. 3B) for connecting with an antenna 360 and communicating with the NFC controller 3202. In one embodiment, the control circuit comprises a built-in NFC controller and an antenna for near field communication according to the SWP.

Referring to FIG. 3A, the NFC controller 3202 receives the data according to the RFID protocol, and then transfers the data to the smart card or SE according to the SWP. In one embodiment, the data transfers to the electrical communication device according to the ISO 7816 protocol, and the invention is not limited thereto. The RFID protocol comprises one of a NFC RFID protocol, the ISO 18092 protocol (NFCIP-1) (ECMA 340) and ISO 21481 protocol (NFCIP-2) (ECMA 352), and is not limited to. The mode of data communication of the RFID protocol comprises one of Read/Write mode, Tag Emulation mode and Peer to Peer mode, and is not limited thereto.

Figure 3B:
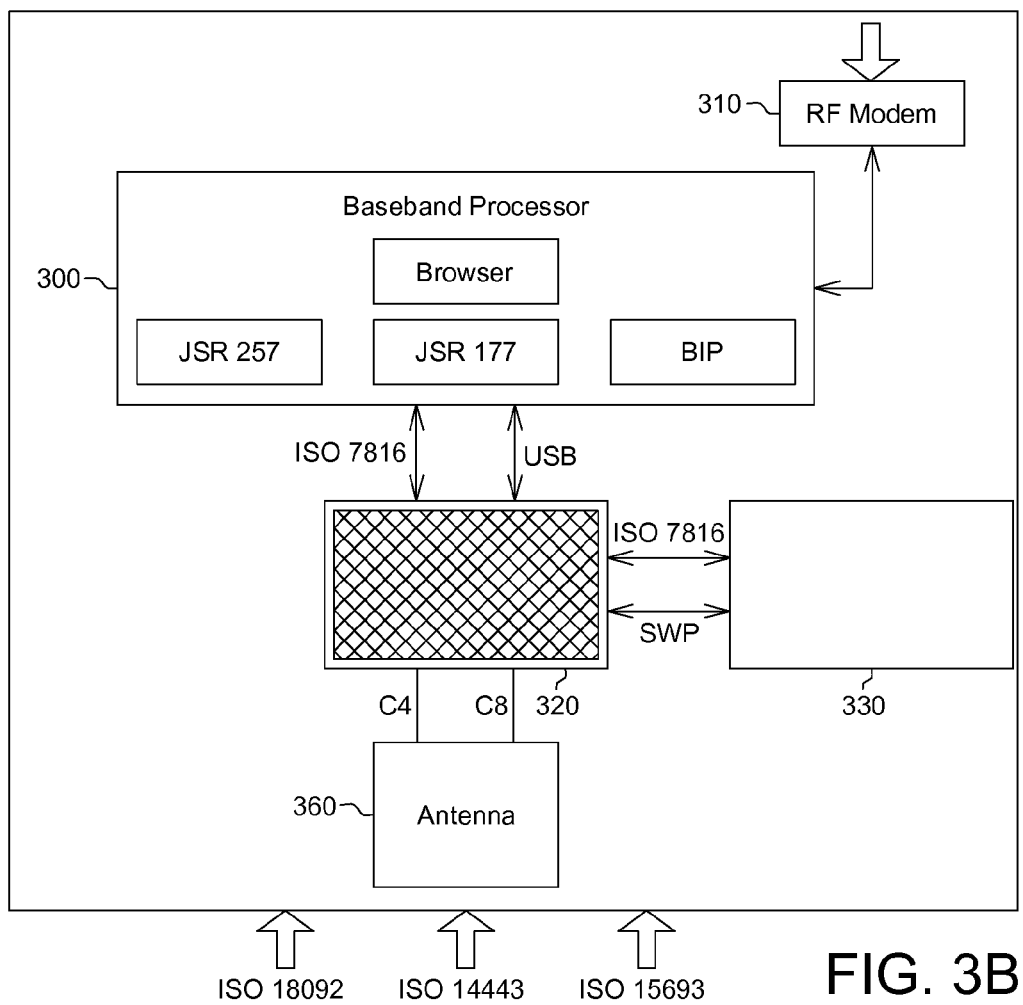
FIG. 3B illustrates a diagram showing a system platform according to still another one embodiment of the invention.

FIG. 3B illustrates a diagram showing a system platform 30. The system platform 30 comprises a diagram showing an integrated circuit film 320 and a smart card 330. The integrated circuit film 320 attaches on the smart card 330. In this embodiment, the contact part of the integrated circuit film 320 comprises a first set of pads located on the first surface for communicating with an electrical communication device without a NFC controller. A second set of pads (not illustrated) locates on the second surface (opposite to the first surface) for communicating with the smart card 330.

In this embodiment, a control circuit (not illustrated) is mounted on the integrated circuit film 320 for communicating with the electrical communication device through one of the first set of pads configured in accordance with a SWP. The control circuit comprises a security element (shown in FIG. 3A) for checking the data received by the NFC controller.

In one embodiment, the arrangement of each of the first and second sets of pads (not illustrated) on the integrated circuit film 320 are configured in accordance with the ISO 7816 protocol. Each corresponding pad of the first set of pads and the second set of pads respectively locates on the first and the second surfaces at a same location. The pads C4 and C8 (not shown) of the first set of pads at the contact part of the integrated circuit film 320 are reserved as pins for electrical connecting to terminals of an antenna 360.

In one embodiment, the control circuit on the integrated circuit film 320 also communicates with the smart card 330 through one of the second set of pads in accordance with the SWP or ISO 7816 protocol. In one embodiment, the control circuit (not shown) on the integrated circuit film 320 communicates with the electrical communication device and the smart card 330 through the first and the second set of pads respectively in accordance with the ISO 7816 protocol.

Referring to FIGS. 3A and 3B, the NFC controller 3202 or the built-in NFC controller receives data in accordance with the RFID protocol, and communicates with the smart card 330 or a security element 335 provided in the control circuit in accordance with the SWP. In one embodiment, the NFC controller 3202 further communicates with the communication device via the first set of pads in accordance with the 7816 protocol.

Figure 4:
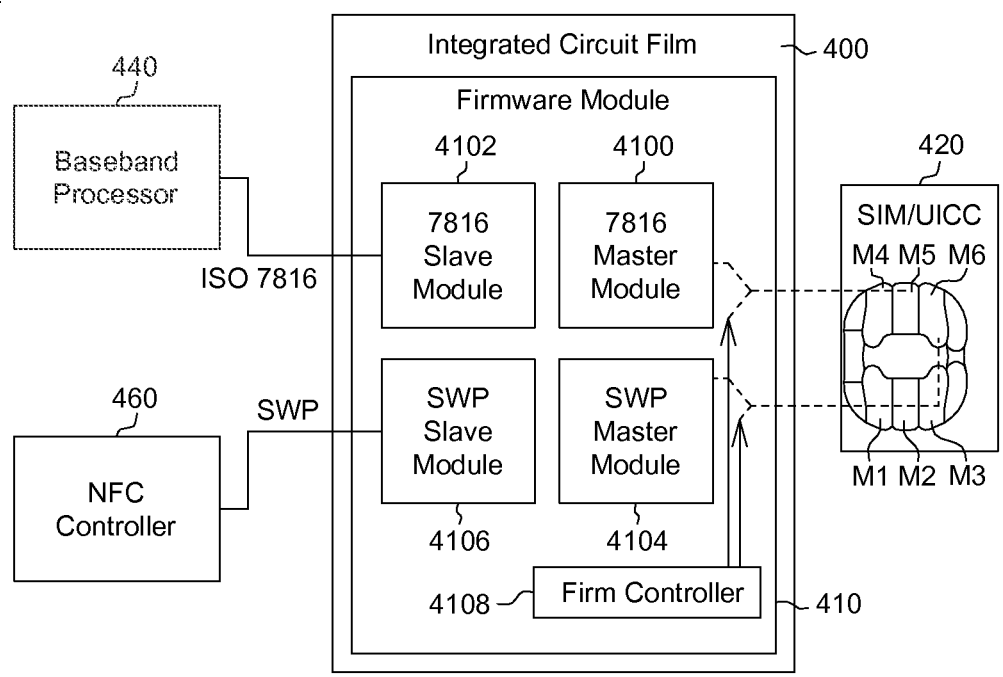
FIG. 4 illustrates block diagrams of a system platform according to one embodiment of the invention.

FIG. 4 illustrates a block diagram of a system platform 40 according to one embodiment of the invention. As depicted in FIG. 4, the control circuit of an integrated circuit film 400 comprises a selection unit, such as a firmware module 410 for selecting communicating with the communication device only or communicating with both of the communication device and the SIM card 420. The firmware module 410 comprises a 7816 master module 4100, a 7816 slave module 4102, a SWP master module 4104, a SWP slave module 4106 and a firm controller 4108.

In this embodiment, the firm controller 410 controls the integrated circuit film 400 for communicating with the baseband processor 440 of an electrical communication device according to the ISO 7816 protocol by the 7816 slave module 4102, or for communicating with the NFC controller 460 of the electrical communication device according to the SWP by the SWP slave module 4106. In one embodiment, the firm controller 410 controls the integrated circuit film 400 for communicating with the SIM/UICC (Universal Integrated Circuit Card) 420 by the 7816 master module 4100 according to the ISO 7816 protocol or by the SWP master module 4104 according to the SWP.

For example, when the integrated circuit film 400 communicates with the SIM/UICC 420 according to the SWP by the pad C6, the SWP master module 4104 is enabled by the firm controller 4108. When the integrated circuit film 400 communicates with the SIM/UICC 420 according to the ISO 7816 communications protocol by the other pads, the 7816 master module 4100 is enabled by the firm controller 4108.

Figure 5:
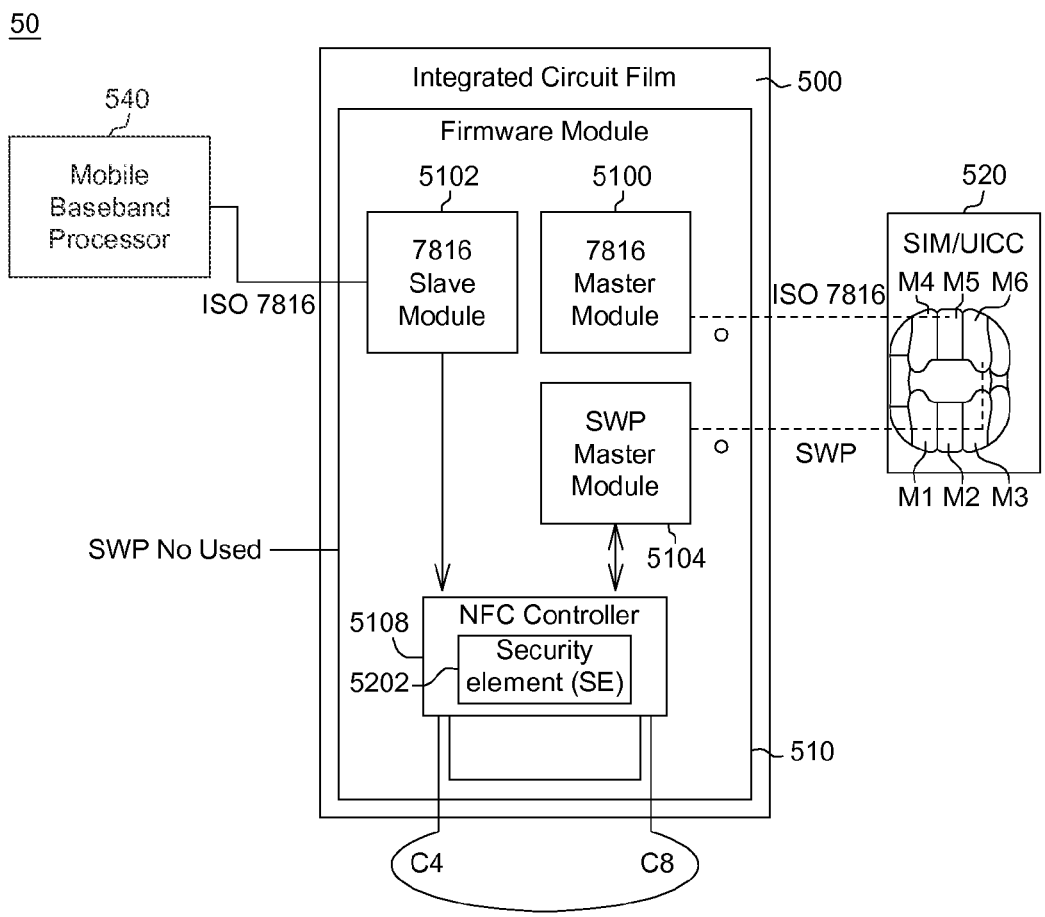
FIG. 5 illustrates block diagrams of a system platform according to another one embodiment of the invention.

FIG. 5 illustrates block diagrams of a system platform 50 according to another one embodiment of the invention. Referring to FIG. 5, an integrated circuit film 500 has a firmware module 510. The firmware module 510 comprises a 7816 master module 5100, a 7816 slave module 5102, a SWP master module 5104 and a NFC controller 5108. An internal security element (SE) 5202 is optionally configured with the NFC controller 5108 in the integrated circuit film 500. Pads C4 and C8 are reserved as pins for electrical connecting to terminals of an antenna.

In this embodiment, the integrated circuit film 500 receives data from baseband processor 540 of an electrical communication device by the 7816 slave module according to the ISO 7816 protocol. The NFC controller 5108 controls a communication with the smart card or the security element SE) 5202 according to the ISO 7816 protocol by the 7816 master module 5100 or according to the SWP by the SWP master module 5104.

Based on the above, the integrated circuit film according to the embodiments of the invention is disposed for communicating between an electrical communication device (such as a mobile phone) and a smart card (such as a SIM card). The integrated circuit film has a control circuit for communicating with the electrical communication device through one of the first set of pads configured in accordance with a single wire protocol (SWP), a communication protocol. In one embodiment, a security element 5202 or a NFC function is added additionally to an electrical communication device that does not have a NFC controller by utilizing the integrated circuit film of the invention. In another embodiment, the integrated circuit film comprises a selection unit for selecting communicating with the communication device only or communicating with both of the communication device and the smart card. According to the embodiments of the invention, the integrated circuit film increases the adaptation between the smart card and the electrical communication device, without consideration the telecom operators, the type of the mobile phone or the type of the smart card. That is, the integrated circuit film of the invention complies with the market requirements.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An integrated circuit film, comprising:
    a circuit board, having an IC-installation part and a contact part and having a first surface and a second surface opposite to the first surface, the contact part comprising:
    a first set of pads located on the first surface for communicating with an electrical communication device; and
    a second set of pads located on the second surface for communicating with a smart card; and
    a control circuit mounted on the IC-installation part for communicating with the electrical communication device through one of the first set of pads selectively in accordance with a single wire protocol (SWP) and in accordance with ISO 7816 protocol, and configured to selectively connect one of the second set of pads for communication with the smart card in accordance with the SWP,
    wherein the control circuit comprises a selection unit and a firmware controller, the firmware controller controls the selection unit for selectively communicating with a baseband processor of the electrical communication device according to the ISO 7816 protocol when selected, and for communicating with a Near Field Communication (NFC) controller of the electrical communication device according to the SWP when selected.

2. The integrated circuit film according to claim 1, wherein further the arrangement of each of the first and second sets of pads configured in accordance with the ISO 7816 protocol, and corresponding pads of the first and the second sets of pads are located on the opposing first and the second surfaces in a mirroring registration about the film.

3. The integrated circuit film according to claim 1, wherein the selection unit comprises a SWP master module and a SWP slave module, and the firmware controller controls the integrated circuit film for communicating with the smart card by the 7816 master module according to the ISO 7816 protocol or by the SWP master module according to the SWP base on selection.

4. The integrated circuit film according to claim 1, wherein the selection unit further comprises a 7816 master module and a 7816 slave module, and the firmware controller controls the integrated circuit film for communicating with the baseband processor of the electrical communication device by the 7816 slave module, or for communicating with the NFC controller of the electrical communication device by the SWP slave module base on selection.

5. The integrated circuit film according to claim 1, wherein some of the corresponding pads of the first and the second sets of pads are respectively connected directly, excluding the one of the first set of pads.

6. The integrated circuit film according to claim 1, wherein the control circuit comprises a control unit functioning as a near field communication (NFC) controller.

7. The integrated circuit film according to claim 1, wherein the control circuit further comprises a built-in NFC controller and an antenna for near field communication according to the SWP.

8. The integrated circuit film according to claim 2, wherein the one of the first set of pads is a named C6 pin configured according to the ISO 7816 protocol.

9. The integrated circuit film according to claim 6, wherein the first set of pads comprises two pads for connecting an antenna and communicating with the NFC controller of the control unit.

10. The integrated circuit film according to claim 6, the control circuit further comprises a security element for checking data received by the NFC controller of the control unit.

11. The integrated circuit film according to claim 6, wherein the NFC controller of the control circuit receives data in accordance with an RFID protocol, and communicates with the smart card when selected, and with a security element provided in the control circuit configured in accordance with the SWP when selected.

12. The integrated circuit film according to claim 11, wherein the RFID protocol comprises one of ISO 18092 (NFCIP-1) (ECMA 340) and ISO 21481 (NFCIP-2) (ECMA 352), and mode of data communication comprises one of Read/Write, Tag Emulation and Peer to Peer.

13. A method for manipulating an integrated circuit film, the integrated circuit film being provided with a circuit board and a control circuit, the circuit board having an IC-installation part and a contact part and having a first surface and a second surface opposite to the first surface, and the contact part comprising a first set of pads on said first surface and a second set of pads on said second surface, the method comprising:
communicating with an electrical communication device by the control circuit mounted on the IC-installation parts through one of the first set of pads located on the first surface relatively in accordance with a single wire protocol(SWP) or ISO 7816 protocol based on selection; and
selectively connecting one of the second set of pads located on the second surface for communicating with a smart card in accordance with SWP,
wherein the control circuit comprises a selection unit and a firmware controller, the firmware controller controls the selection unit for selectively communicating with a baseband processor of the electrical communication device according to the ISO 7816 protocol when selected, and for communicating with a Near Field Communication (NFC) controller of the electrical communication device according to the SWP.

14. The method for manipulating the integrated circuit film according to claim 13, wherein the one of the first set of pads is a named C6 pin configured according to the ISO 7816 protocol.

15. The method for manipulating the integrated circuit film according to claim 13, wherein the selection unit comprises a SWP master module and a SWP slave module, the method further comprises:
controlling by the firmware controller the integrated circuit film for communicating with the smart card by the 7816 master module according to the ISO 7816 protocol when selected, and by the SWP master module according to the SWP when selected.

16. The method for manipulating the integrated circuit film according to claim 13, wherein the selection unit further comprises a 7816 master module and a 7816 slave module, and the firmware controller controls the integrated circuit film for communicating with the baseband processor of the electrical communication device by the 7816 slave module when selected, and for communicating with the NFC controller of the electrical communication device by the SWP slave module when selected.

17. The method for manipulating the integrated circuit film according to claim 13, wherein the control circuit comprises a control unit functioning as a near field communication (NFC) controller.

18. The method for manipulating the integrated circuit film according to claim 17, the control circuit further comprises a security element, the method further comprises:
checking data received by the NFC controller of the control circuit by the security element.

19. The method for manipulating the integrated circuit film according to claim 17, further comprises:
utilizing the NFC controller of the control circuit to receive data in accordance with an RFID protocol;
utilizing the NFC controller of the control circuit to communicate with the smart card when selected, and with a security element provided in the control circuit in accordance with the SWP when selected; and
utilizing the NFC controller of the control circuit to communicate with the communication device via the first set of pads in accordance with the ISO 7816 protocol.

20. The method for manipulating the integrated circuit film according to claim 19, wherein the RFID protocol comprises one of ISO 18092 (NFCIP-1) (ECMA 340) and ISO 21481 (NFCIP-2) (ECMA 352), and mode of data communication comprises one of Read/Write, Tag Emulation, and Peer to Peer.

* * * * *